(12) United States Patent
Jeon et al.

(10) Patent No.: US 8,421,936 B2
(45) Date of Patent: Apr. 16, 2013

(54) DISPLAY PANEL, DISPLAY APPARATUS HAVING THE SAME, AND METHOD OF MANUFACTURING THE SAME

(75) Inventors: Jin Jeon, Suwon-si (KR); Hyung-Guel Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 122 days.

(21) Appl. No.: 12/822,981

(22) Filed: Jun. 24, 2010

(65) Prior Publication Data

US 2010/0259520 A1 Oct. 14, 2010

Related U.S. Application Data

(62) Division of application No. 11/400,540, filed on Apr. 6, 2006, now Pat. No. 7,787,066.

(30) Foreign Application Priority Data

Apr. 6, 2005 (KR) .................................. 2005-28623

(51) Int. Cl.
G02F 1/1343 (2006.01)

(52) U.S. Cl.
USPC .............................................. 349/38; 349/39

(58) Field of Classification Search .................... 349/38, 349/39
See application file for complete search history.

(56) References Cited

U.S. PATENT DOCUMENTS

| | | | |
|---|---|---|---|
| 5,936,693 A | 8/1999 | Yoshida et al. | |
| 6,927,825 B1 | 8/2005 | Koma et al. | |
| 7,995,183 B2* | 8/2011 | Yamazaki et al. | 349/152 |
| 2002/0012078 A1 | 1/2002 | Jung et al. | |
| 2003/0160236 A1* | 8/2003 | Yamazaki et al. | 257/53 |
| 2005/0012542 A1 | 1/2005 | Kushima et al. | |
| 2005/0041166 A1* | 2/2005 | Yamazaki et al. | 349/42 |
| 2005/0253773 A1* | 11/2005 | Sekiguchi | 345/1.1 |
| 2007/0176176 A1* | 8/2007 | Yamazaki et al. | 257/59 |
| 2008/0204613 A1 | 8/2008 | Kim et al. | |
| 2008/0246036 A1* | 10/2008 | Yamazaki et al. | 257/72 |
| 2009/0283775 A1* | 11/2009 | Yamazaki et al. | 257/72 |

FOREIGN PATENT DOCUMENTS

| | | |
|---|---|---|
| CN | 1357783 | 7/2002 |
| CN | 1504816 A | 6/2004 |
| JP | 07-261191 A | 10/1995 |
| JP | 2002-169176 A | 6/2002 |
| KR | 1999-0035287 A | 5/1999 |
| KR | 1020010109485 A | 12/2001 |
| WO | 2004-051355 | 6/2004 |

* cited by examiner

*Primary Examiner* — K. Cyrus Kianni
(74) *Attorney, Agent, or Firm* — Innovation Counsel LLP

(57) ABSTRACT

A display panel including a first capacitor and a second capacitor is disclosed. The first and second capacitors boost a second driving voltage from a driving chip and apply the boosted second driving voltage to the driving chip. The driving chip receives the boosted second driving voltage and outputs a first driving voltage to drive the display panel. Thus, the display panel does not require any additional capacitor for boosting the second driving voltage, thereby reducing a thickness and a manufacturing cost of the display panel.

4 Claims, 21 Drawing Sheets

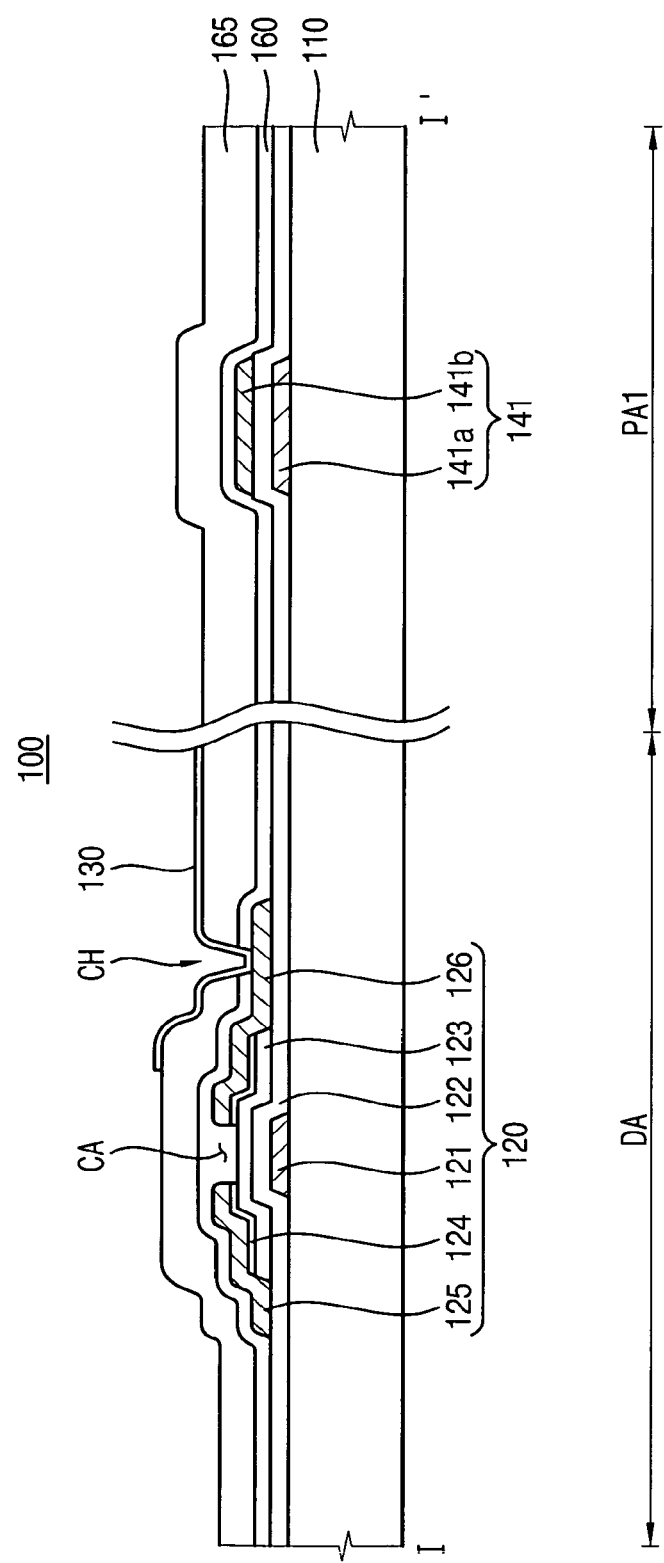

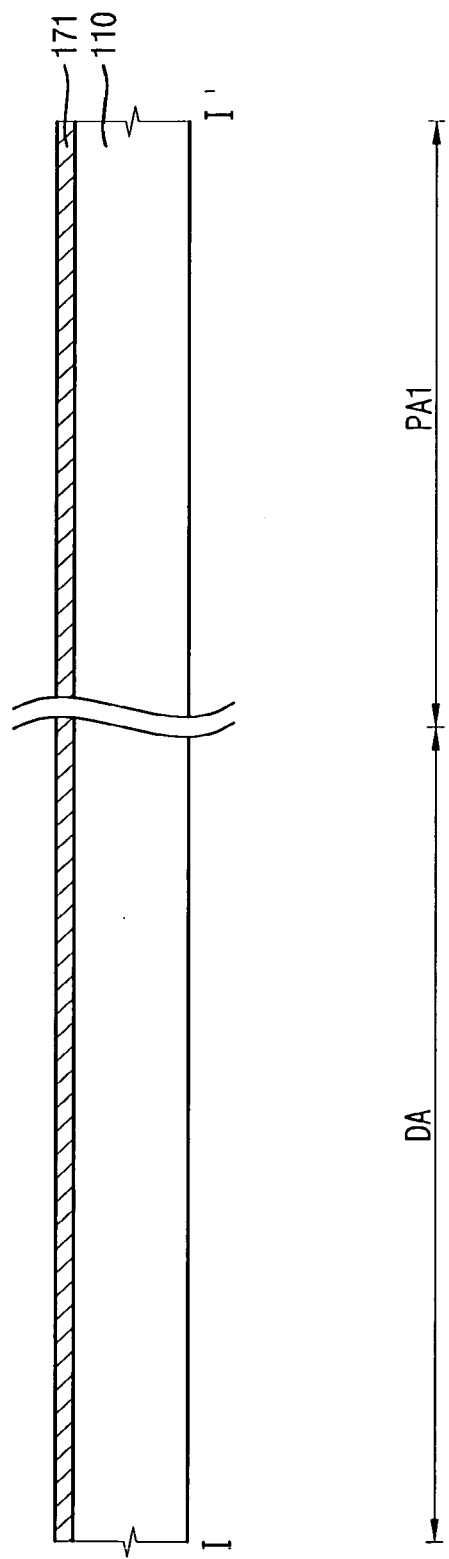

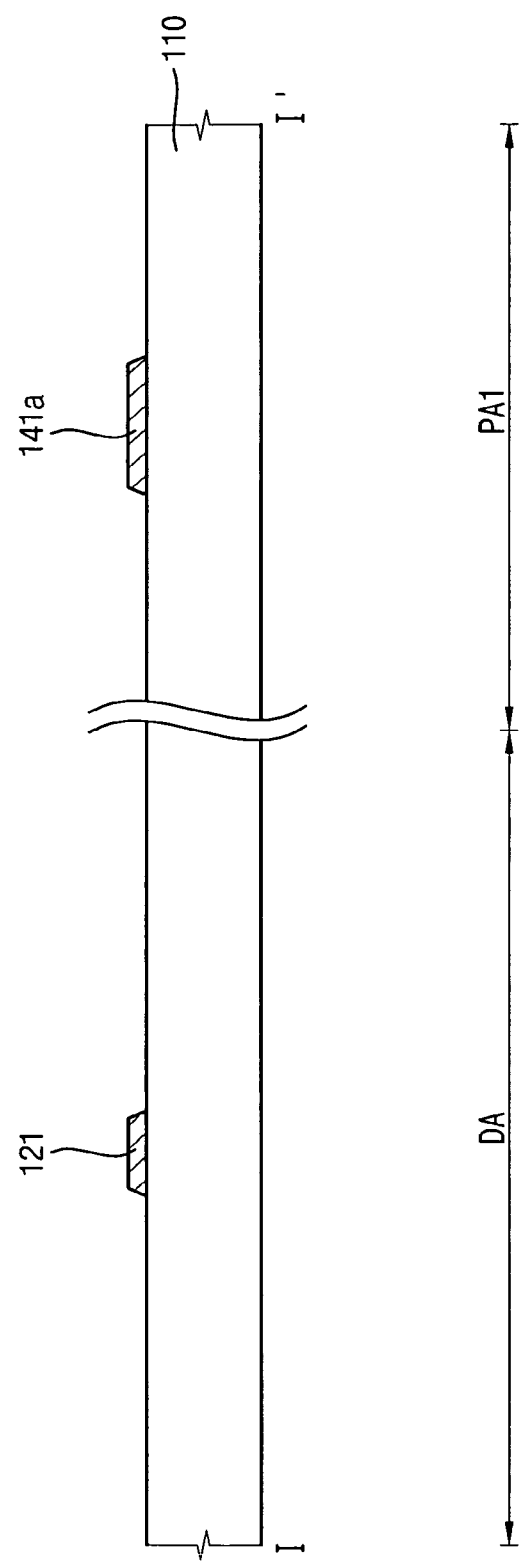

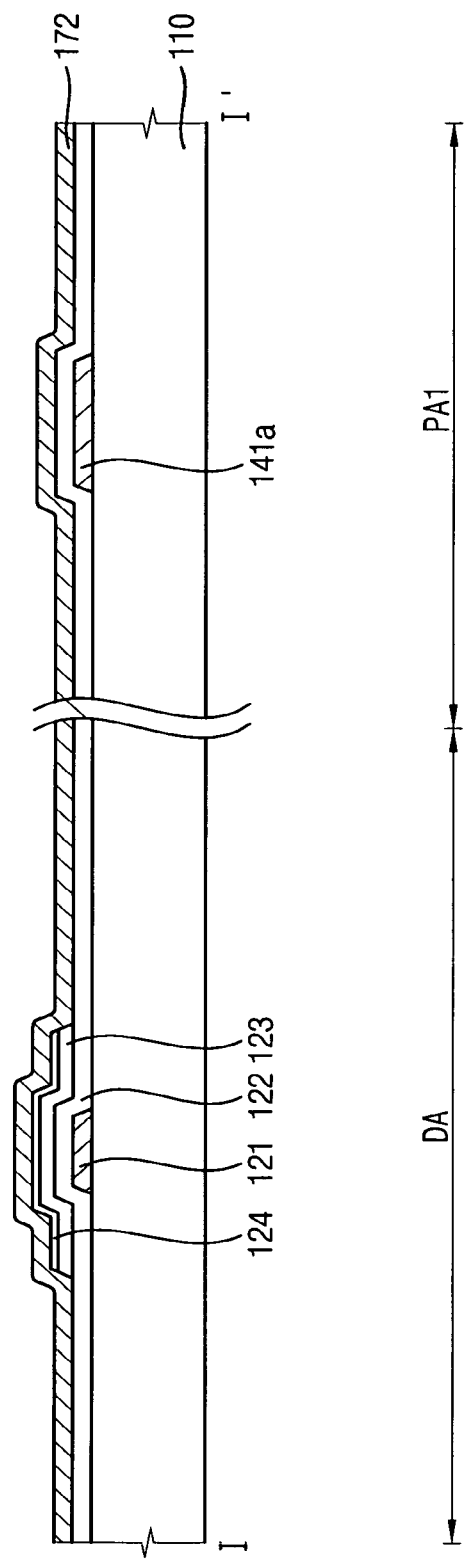

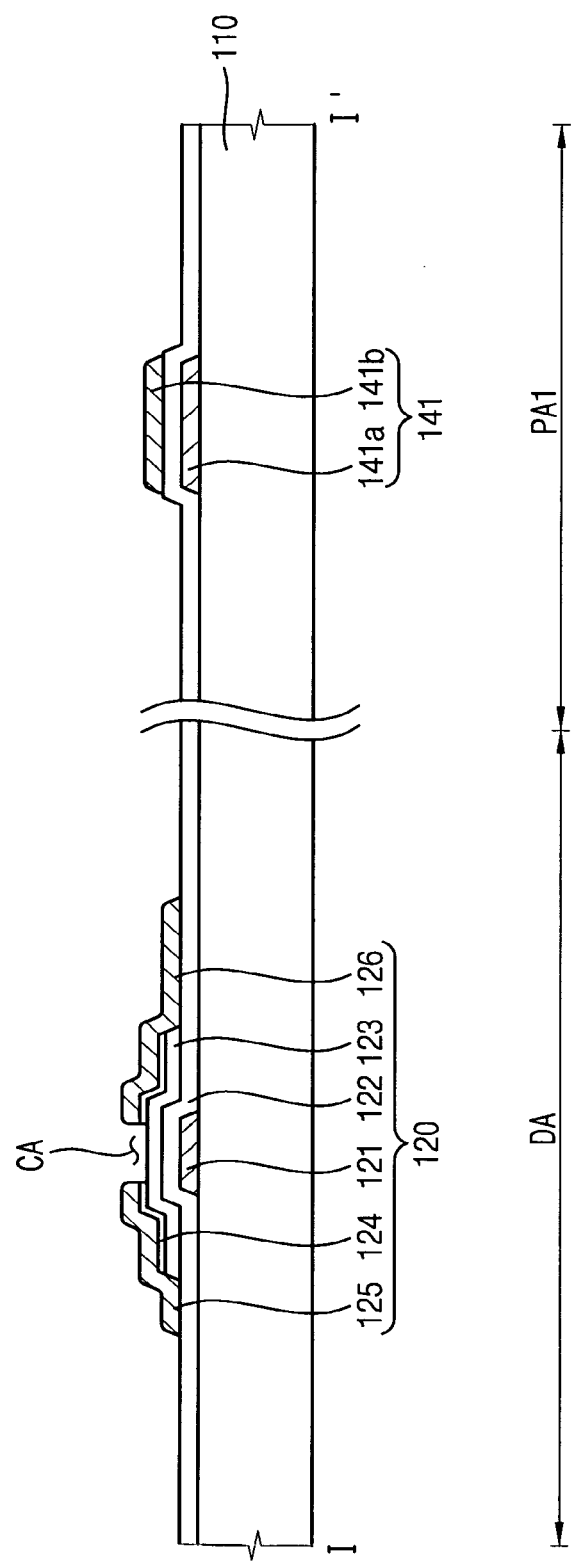

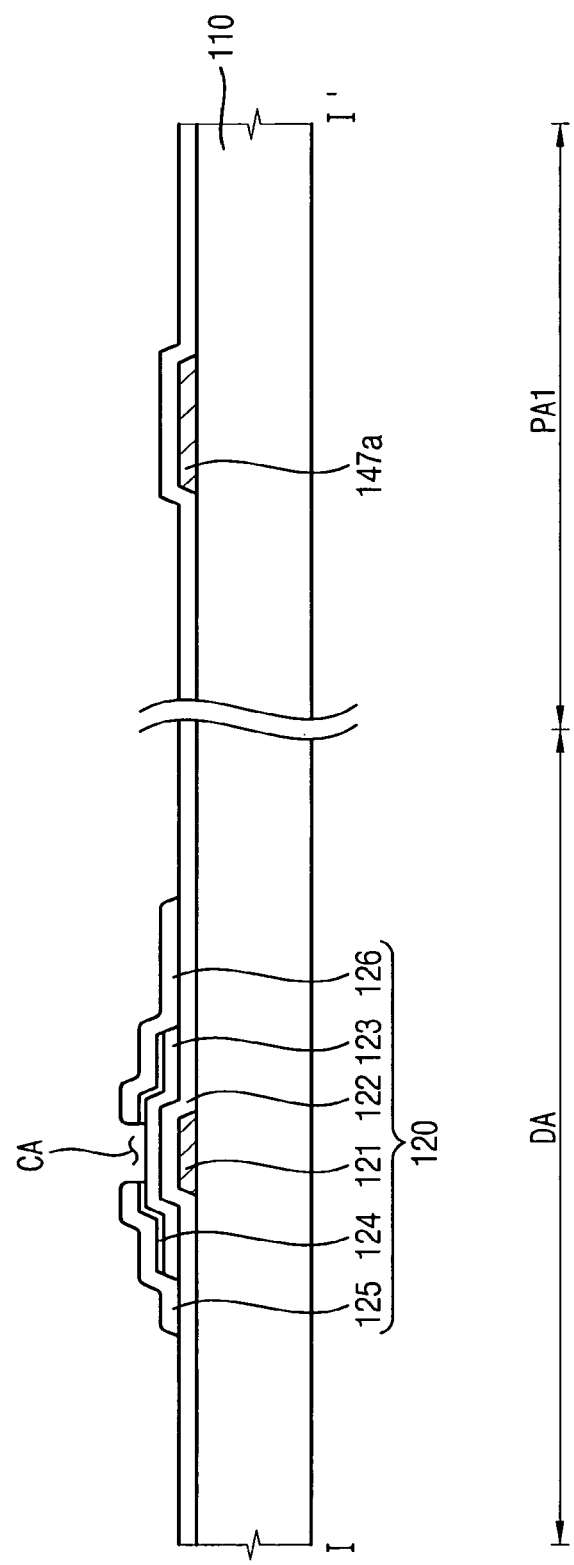

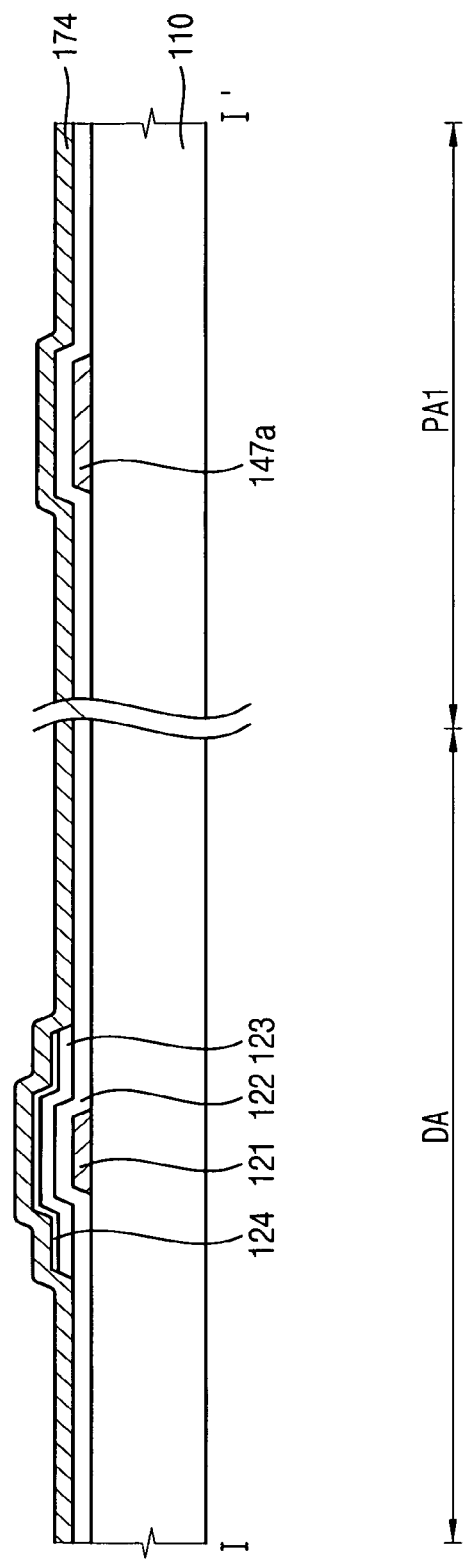

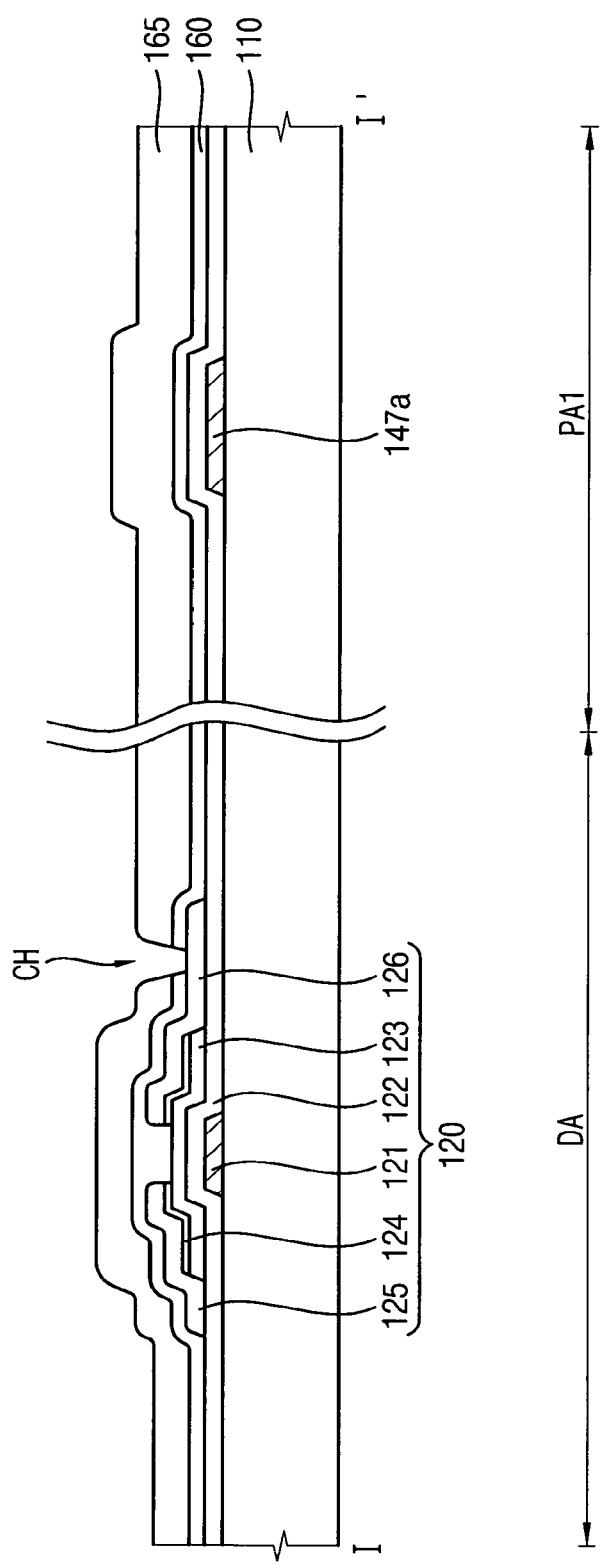

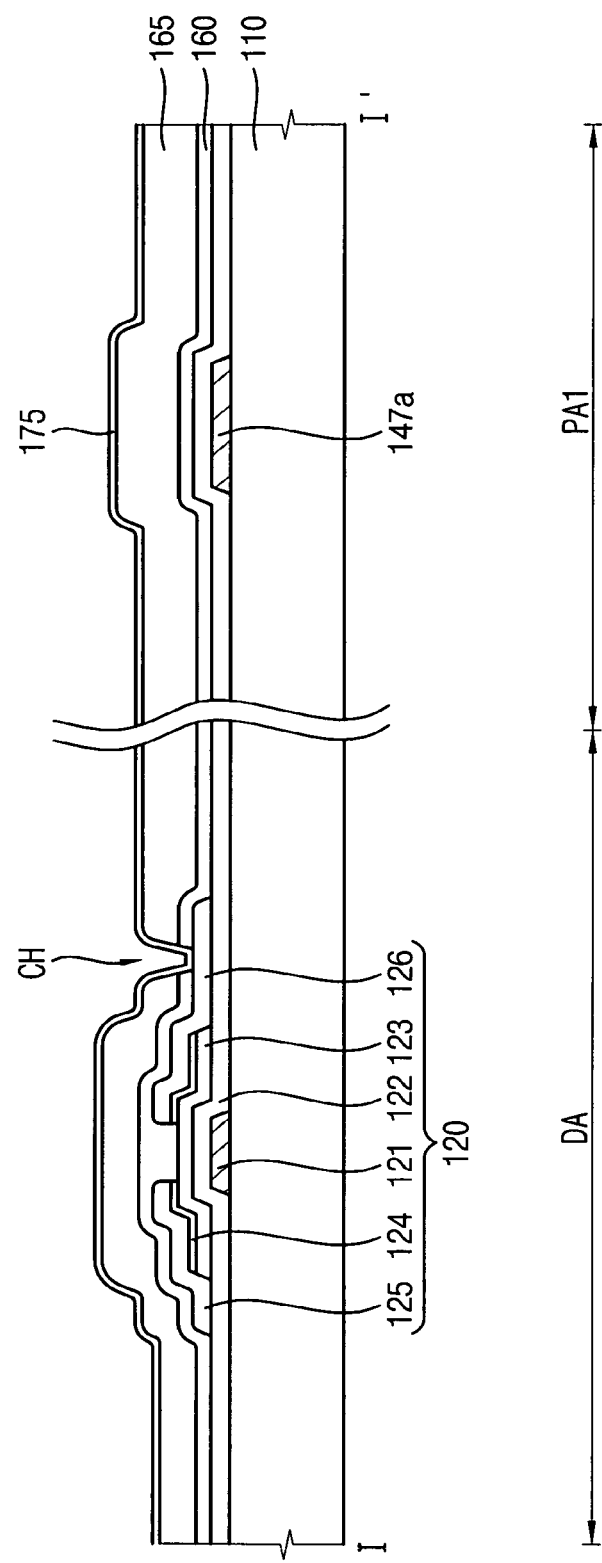

DISPLAY PANEL, DISPLAY APPARATUS HAVING THE SAME, AND METHOD OF MANUFACTURING THE SAME

CROSS-REFERENCE TO RELATED APPLICATIONS

This is a divisional application of U.S. patent application Ser. No. 11/400,540, filed Apr. 6, 2006, which application relies for priority upon Korean Patent Application No. 2005-28623 filed on Apr. 6, 2005, the contents of which are herein incorporated by reference in their entireties and for all purposes.

BACKGROUND

1. Field of the Invention

The present invention relates to a display panel, a display apparatus having the display panel, and a method of manufacturing the display panel. More particularly, the present invention relates to a display panel having a reduced thickness, a display apparatus having the display panel, and a method of manufacturing the display panel.

2. Description of the Related Art

In general, a display apparatus displays an image in response to an image signal. A liquid crystal display (LCD) apparatus is a flat-type display apparatus which displays the image using optical characteristics of liquid crystal. The LCD apparatus includes a LCD panel that displays the image thereon and a backlight assembly that supplies a light to the LCD panel.

Weight, volume, and power consumption of the LCD apparatus depend upon the size of the LCD panel and the design of the backlight assembly. For a medium to small-sized (portable) device such as a mobile phone, a personal digital assistant, etc., a backlight assembly having various advantageous characteristics such as light weight, thin thickness, and low power consumption has been developed.

A LCD panel applied to the medium-small sized device includes a flexible printed circuit board (PCB) for transmitting the image signal and a driving chip for outputting a driving signal for the LCD panel. The flexible PCB includes a capacitor to boost a driving voltage for the LCD apparatus.

The backlight assembly includes a light emitting diode (LED) that emits a light, a light guide plate that guides the light, a mold frame that receives the LED and the light guide plate, and a bottom chassis that receives the mold frame.

The LCD panel is disposed on a stepped portion formed at a sidewall of the mold frame. The flexible PCB is bent along a sidewall of the bottom chassis and disposed on a rear face of the bottom chassis. The semiconductor chips and the capacitor are disposed on the rear face of the bottom chassis, so that a thickness of the LCD apparatus increases.

The thickness of the LCD apparatus greatly increases due to the thickness of the capacitor. In order to mount the capacitor on the flexible PCB, an insulating film, a conductive layer, and an adhesive layer are needed, thereby increasing the layers for manufacturing the flexible PCB, and accordingly increasing the thickness of the LCD apparatus.

SUMMARY

The present invention provides a display panel having a reduced thickness, a display apparatus having such a display panel, and a method suitable for manufacturing such a display panel.

In one aspect of the present invention, a display panel includes a substrate, a thin film transistor, and a first capacitor. The substrate includes a first area on which an image is displayed, a second area surrounding the first area, and a third area adjacent to the second area. The thin film transistor receives a first driving voltage used to display the image and is formed in the first area. The first capacitor boosts a second driving voltage from an exterior source and outputs the boosted second driving voltage. The first capacitor is formed in the second area.

In another aspect of the present invention, a display apparatus includes a display panel and a signal generator. The display panel includes a substrate, a thin film transistor, and a first capacitor. The substrate includes a first area on which an image is displayed, a second area surrounding the first area, and a third area adjacent to the second area. The thin film transistor receives a first driving voltage used to display the image and is formed in the first area. The first capacitor boosts a second driving voltage from an exterior source and outputs the boosted second driving voltage. The first capacitor is formed in the second area. The signal generator receives the second driving voltage from the first capacitor and outputs the first driving voltage. The signal generator is formed in the third area and electrically connected to the first capacitor and the thin film transistor.

In still another aspect of the present invention, a method of manufacturing a display panel is provided as follows. A first metal layer is formed on a substrate. The first metal layer is patterned to form a gate electrode in a first area on which an image is displayed and a first electrode of a first capacitor in a second area surrounding the first area. An insulating layer is formed on the substrate on which the gate electrode and the first electrode are formed. A second electrode of the first capacitor is formed on the insulating layer corresponding to the second area.

Advantageously, in the above embodiments of the present invention the first capacitor for boosting the second driving voltage is included on a substrate of the display panel. Thus, the display panel needs no additional capacitor for boosting the second driving voltage, thereby reducing thickness and manufacturing cost of the display panel.

BRIEF DESCRIPTION OF THE DRAWINGS

The above and other advantages of the present invention will become readily apparent by reference to the detailed description when considered in conjunction with the following accompanying drawings:

FIG. 3 is a cross-sectional view taken along a line I-I' in FIG. 2;

FIGS. 4A to 4G are views illustrating a method of manufacturing the first substrate in FIG. 3;

FIGS. 6A to 6F are views illustrating a method of manufacturing a first main capacitor in FIG. 5;

DETAILED DESCRIPTION

Figure 1:
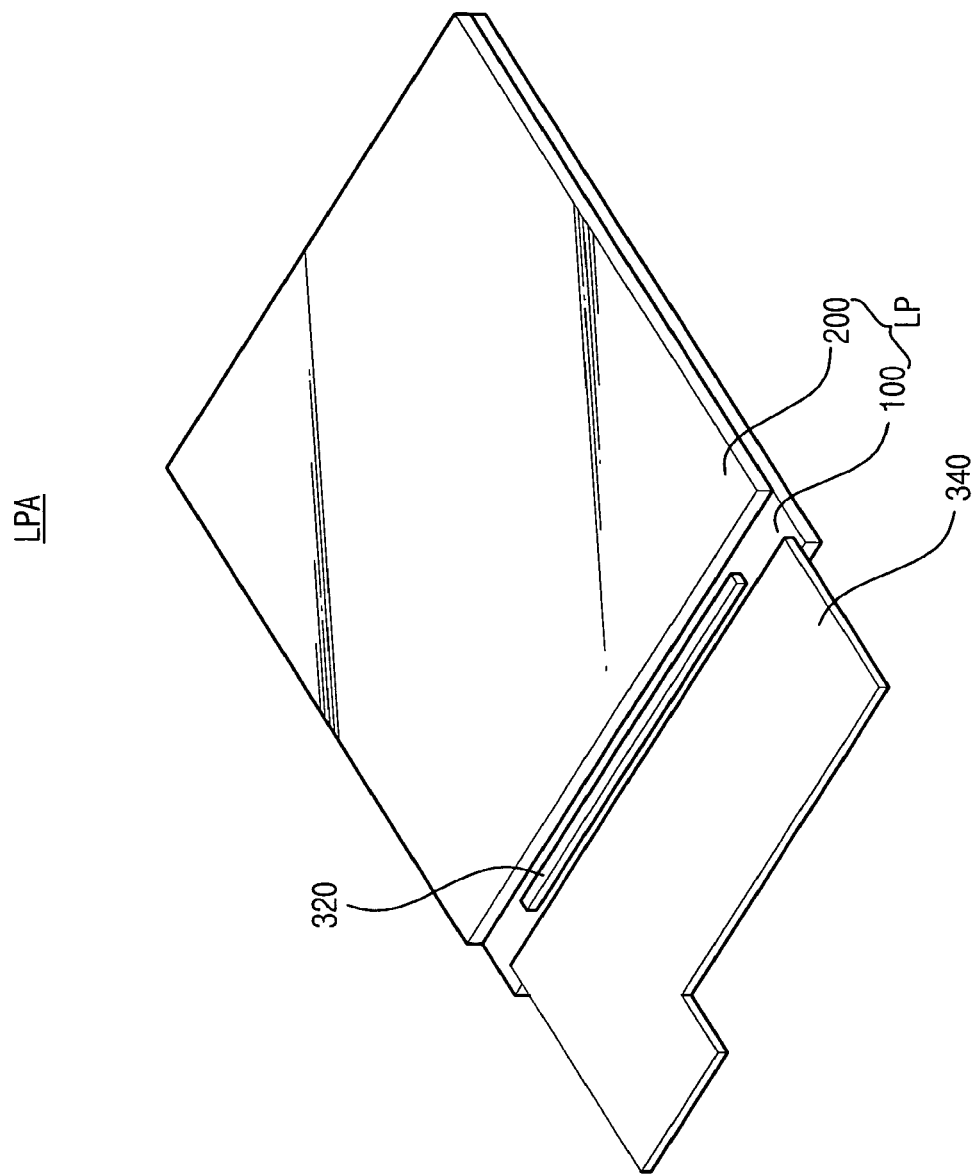
FIG. 1 is a perspective view showing a display panel assembly according to an embodiment of the present invention.

It will be understood that when an element or layer is referred to as being "on", "connected to", or "coupled to" another element or layer, it can be directly on, connected, or coupled to the other element or layer or intervening elements or layers may be present. In contrast, when an element is referred to as being "directly on", "directly connected to", or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer or section without departing from the teachings of the present invention. Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over (i.e., rotated 180° along an axis perpendicular to the page), elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawing-s.

FIG. 1 is a perspective view showing a display panel assembly according to an embodiment of the present invention.

Referring to FIG. 1, a display panel assembly LPA includes a liquid crystal display panel LP that displays an image in response to a first driving voltage, a driving chip 320 that outputs the first driving voltage in response to a second driving voltage, and a flexible circuit part 340 that applies the second driving voltage to the driving chip 320.

In one embodiment, the liquid crystal display panel LP includes a first substrate 100, a second substrate 200 coupled to the first substrate 100, and a liquid crystal layer (not shown) disposed between the first substrate 100 and the second substrate 200.

The first substrate 100 includes a plurality of pixels (not shown) formed thereon in a matrix configuration and is electrically connected to the driving chip 320 to receive the first driving voltage from the driving chip 320.

The second substrate 200 includes a color filter layer that displays a predetermined color using a light applied from the liquid crystal layer. The color filter layer includes RGB color pixels and is formed by a thin film process.

When an electric field is generated between the first and second substrates 100 and 200, the electric field varies an aligning angle of liquid crystal molecules of the liquid crystal layer. Thus, a light transmittance of the liquid crystal is varied in accordance with the variation of the aligning angle of the liquid crystal, so a desired image may be obtained.

The driving chip 320 and the flexible circuit part 340 are attached to a source side of the first substrate 100. The driving chip 320 and the flexible circuit part 340 are electrically connected to the first substrate 100 using an anisotropic conductive film in one example.

The driving chip 320 applies the driving signal for the liquid crystal display panel LP and the first driving voltage to the first substrate 100. The driving chip 320 may include two or more chips divided into a chip for a data line and a chip for a gate line, or the driving chip 320 may be an integrated single chip. The driving chip 320 is mounted on the first substrate 100 by a chip-on-glass process.

The flexible circuit part 340 is electrically connected to the driving chip 320 to apply a control signal for the driving chip 320 and the second driving voltage to the driving chip 320. The flexible circuit part 340 may include a timing controller for controlling a timing of the driving signal or a memory for storing a data signal coming into and/or coming out of flexible circuit part 340.

Figure 2:
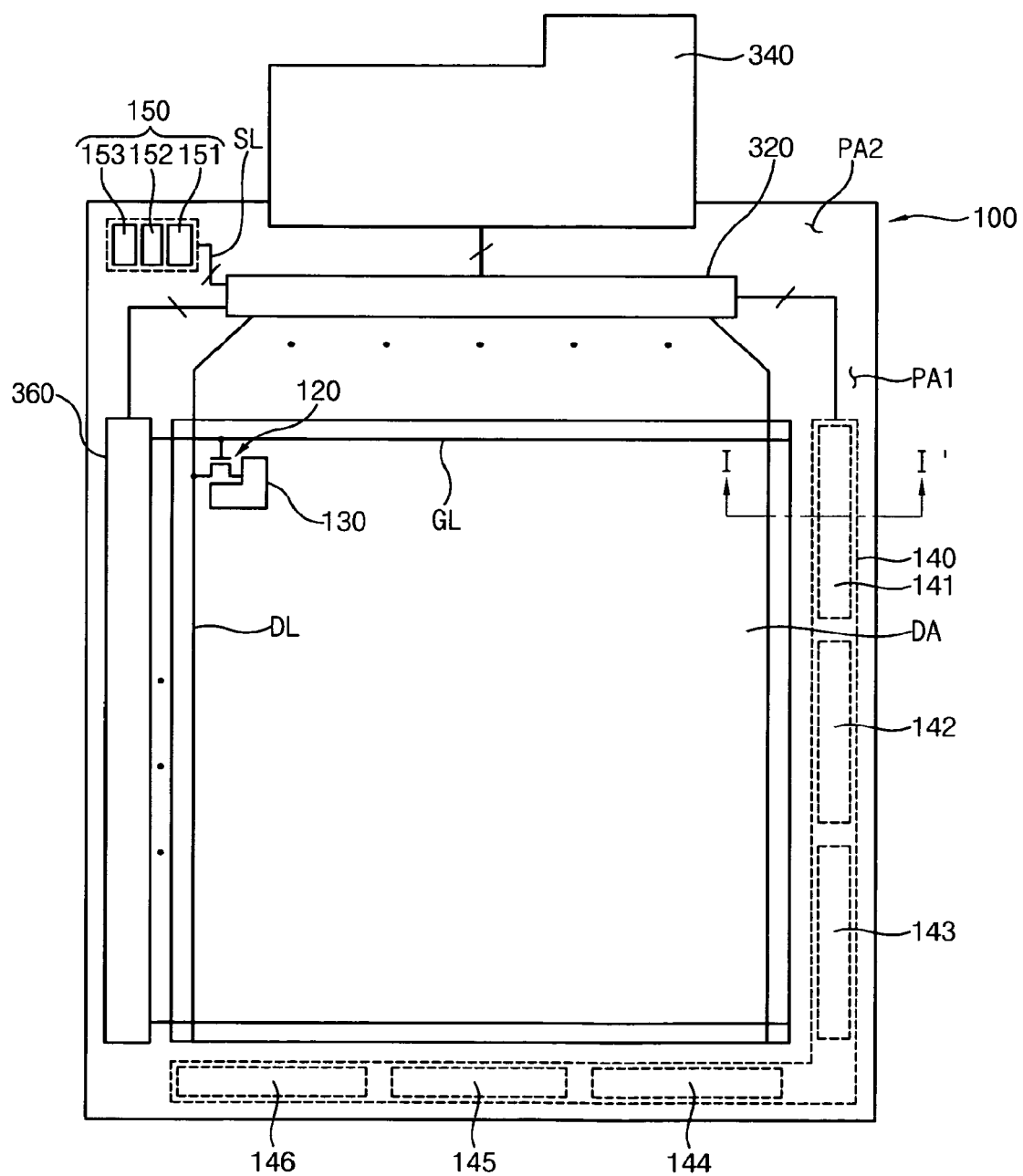
FIG. 2 is a plan view showing a first substrate in FIG. 1.

FIG. 2 is a plan view showing the first substrate 100 in FIG. 1 in more detail. FIG. 3 is a cross-sectional view taken along a line I-I' in FIG. 2.

Referring now to FIG. 2, the first substrate 100 includes a display area DA on which an image is displayed, a first peripheral area PA1 surrounding the display area DA, and a second peripheral area PA2 adjacent to the first peripheral area PA1. The pixels are formed in the display area DA, and the driving chip 320 and the flexible circuit part 340 are formed in the second peripheral area PA2. The first substrate 100 includes a gate line GL transmitting a gate signal, a data line DL transmitting a data signal, a thin film transistor (TFT) 120 connected to the gate and data lines GL and DL, a pixel electrode 130 connected to the TFT 120, and a main capacitor part 140.

In one embodiment, the gate line GL is insulated from and substantially perpendicular to the data line DL in the display area DA. Pixel areas in which the pixels are formed are defined by the gate line GL and the data line DL. The gate and data lines GL and DL are electrically connected to the driving chip 320 to transmit the first driving voltage from the driving chip 320 to the TFT 120.

The TFT 120 formed in the pixel areas applies and blocks the first driving voltage to the liquid crystal layer.

Referring now to FIG. 3, the TFT 120 includes a gate electrode 121 formed on a transparent substrate 110, a gate insulating layer 122 formed on the transparent substrate 110 to cover the gate electrode 121, an active layer 123 formed on the gate insulating layer 122, an ohmic contact layer 124 formed on the active layer 123, a source electrode 125 formed on the ohmic contact layer 124, and a drain electrode 126 spaced apart from the source electrode 125 and formed on the ohmic contact layer 124.

The gate electrode 121 is branched from the gate line GL transmitting the gate signal. In the present embodiment, the gate electrode 121 may be a single layer, but it may be a double layer, a triple layer, or one of a various number of layers.

The gate insulating layer 122 is formed over the gate electrode 121 and on the transparent substrate 110 on which the gate electrode 121 is formed. The gate insulating layer 122 includes an insulating material, such as silicon oxide ($SiO_2$) or silicon nitride ($SiN_x$), in order to prevent an air layer between the gate electrode 121, the transparent substrate 110, the active layer 123, the source electrode 125, and the drain electrode 126.

The active layer 123 includes polycrystalline silicon. The active layer 123 is formed on the gate insulating layer 122 corresponding to the gate electrode 121.

The ohmic contact layer 124 formed on the active layer 123 includes $N^+$ polycrystalline silicon. The ohmic contact layer 124 includes a channel area CA to partially expose the active layer 123.

The source electrode 125 and the drain electrode 126 are formed on the ohmic contact layer 124. In the present embodiment, the source and drain electrodes 125 and 126 may be a single layer, a double layer, a triple layer, or one of a various number of layers.

The source electrode 125 is branched from the data line DL transmitting the data signal. The source electrode 125 includes a first end disposed on the ohmic contact layer 124 and a second end disposed on the gate insulating layer 122.

The drain electrode 126 is spaced apart from the source electrode 125, and the channel layer CA is disposed between the source and drain electrodes 125 and 126. The drain electrode 126 includes a first end disposed on the ohmic contact layer 124 and a second end disposed on the gate insulating layer 122.

The first substrate 100 further includes a passivation layer 160 and an organic insulating layer 165 formed on the transparent substrate 110 on which the TFT 120 is formed. The passivation layer 160 and the organic insulating layer 165 protect the gate and data lines GL and DL.

The passivation layer 160 includes an inorganic insulating material, for example silicon oxide ($SiO_2$) or silicon nitride ($SiN_x$), and has a thickness of about 2000 angstroms. The organic insulating layer 165 is formed on the passivation layer 160. The passivation layer 160 and the organic insulating layer 165 include a contact hole CH through which the drain electrode 126 is partially exposed.

The pixel electrode 130 is formed on the organic insulating layer 165. The pixel electrode 130 is electrically connected to the drain electrode 126 to apply the first driving voltage to the liquid crystal layer. The pixel electrode 130 includes a transparent conductive material such as indium tin oxide (ITO) or indium zinc oxide (IZO).

Although not shown in the figures, a reflective electrode may be further formed on the pixel electrode 130 to reflect a light externally provided when the display panel assembly is operated in a reflective mode.

Referring again to FIG. 2, the main capacitor part 140 is formed in the first peripheral area PA1 of the transparent substrate 110. The main capacitor part 140 is formed in the first peripheral area PA1 while the TFT 120 is formed in the display area DA.

In the present embodiment, the main capacitor part 140 includes first, second, third, fourth, fifth, and sixth main capacitors 141, 142, 143, 144, 145, and 146. However, the number of main capacitors included in the main capacitor part 140 may increase or decrease according to the desired intensity of the second driving voltage and capacitance of the main capacitors.

The first, second, third, fourth, fifth, and sixth main capacitors 141-146 are electrically connected to the driving chip 320 to boost the second driving voltage from the driving chip 320. The second driving voltage outputted from the main capacitors 141-146 is then applied to the driving chip 320.

Thus, at least an insulating film, a conductive layer, and an adhesive layer for the flexible circuit part 340 may be eliminated since the flexible circuit part 340 needs no additional capacitor for boosting the second driving voltage. As a result, the thickness and the manufacturing cost of the flexible circuit part 340 may be reduced.

In the present embodiment, each of the main capacitors 141-146 has the same function and same structure. Accordingly, the first main capacitor 141 will be described in detail, and detailed description of the second to sixth main capacitors 142 to 146 will be omitted.

As shown in FIG. 3, the first main capacitor 141 includes a first electrode 141a formed on the transparent substrate 110 and a second electrode 141b formed over the first electrode 141a.

The first electrode 141a is formed on the same layer as gate electrode 121, and the first electrode 141a includes the same material as the gate electrode 121.

The second electrode 141b is formed over the first electrode 141a. The second electrode 141b is formed on the same layer as a layer on which the source and drain electrodes 125 and 126 are formed, and the second electrode 141b includes a same material as the source and drain electrodes 125 and 126.

The gate insulating layer 122 is disposed between the first electrode 141a and the second electrode 141b. The gate insulating layer 122 functions as a dielectric substance of the first main capacitor 141.

When the second driving voltage is applied to the first main capacitor 141 from the driving chip 320, an electric charge is stored into a space between the first electrode 141a and the second electrode 141b to boost the second driving voltage, so that the first main capacitor 141 outputs the boosted second driving voltage.

The first substrate 100 further includes a sub capacitor part 150 (FIG. 2) to boost the second driving voltage from the driving chip 320.

In the present embodiment, the sub capacitor part 150 includes first, second, and third sub capacitors 151, 152, and 153. However, the number of sub capacitors included in the sub capacitor port 150 may increase or decrease according to the desired intensity of the second driving voltage and capacitance of the sub capacitors.

The first, second, and third sub capacitors 151, 152, and 153 are formed in the second peripheral area PA2 and have a larger capacitance than the first, second, third, fourth, fifth, and sixth main capacitors 141-146. The first, second, and third sub capacitors 151, 152, and 153 are disposed adjacent to the driving chip 320 and have a thickness smaller than or equal to the driving chip 320.

The first, second, and third sub capacitors 151, 152, and 153 are electrically connected to the driving chip 320. The first, second, and third sub capacitors 151, 152, and 153 boost the second, driving voltage from the driving chip 320. The second driving voltage from the first, second and third sub capacitors 151, 152, and 153 is applied to the driving chip 320.

The display panel assembly LPA (refer to FIG. 1) further includes a gate driving circuit 360 electrically connected to the driving chip 320 so as to output the gate signal. The gate driving circuit 360 is electrically connected to the gate line GL and applies the gate signal to the gate line GL. The gate driving circuit 360 is formed by same processes as those for the TFT 120, and the gate driving circuit 360 is formed in the first peripheral area PA1 of the substrate 100 while the TFT 120 is formed. The gate driving circuit 360 may be built-in within the driving chip 320, or separately mounted in the first peripheral area PA1. When the gate driving circuit 360 is built-in with the driving chip 320, the driving chip 320 outputs the gate signal and applies the gate signal to the gate line GL.

Hereinafter, a manufacturing method of the TFT 120 and the main capacitor part 140 will be described with reference to the drawings.

FIGS. 4A to 4G are views illustrating a method of manufacturing the first substrate 100 in FIG. 3. In the present embodiment, a manufacturing process for the first main capacitor 141 will be described in detail, and detailed description of the manufacturing process for the second, third, fourth, fifth, and sixth main capacitors 142-146 will be omitted since the first, second, third, fourth, fifth, and sixth main capacitors 141-146 are each formed by the same process.

Referring to FIGS. 4A and 4B, a first metal layer 171 is formed on the transparent substrate 110 by a sputtering method. The first metal layer 171 includes a conductive metal material, such as chromium (Cr), molybdenum (Mo), aluminum alloy such as aluminum (Al) or aluminum-neodymium (AlNd), etc.

The first metal layer 171 is patterned to form the gate electrode 121 in the display area DA and the first electrode 141a of the first main capacitor 141 in the first peripheral area PA1.

Figure 4C:
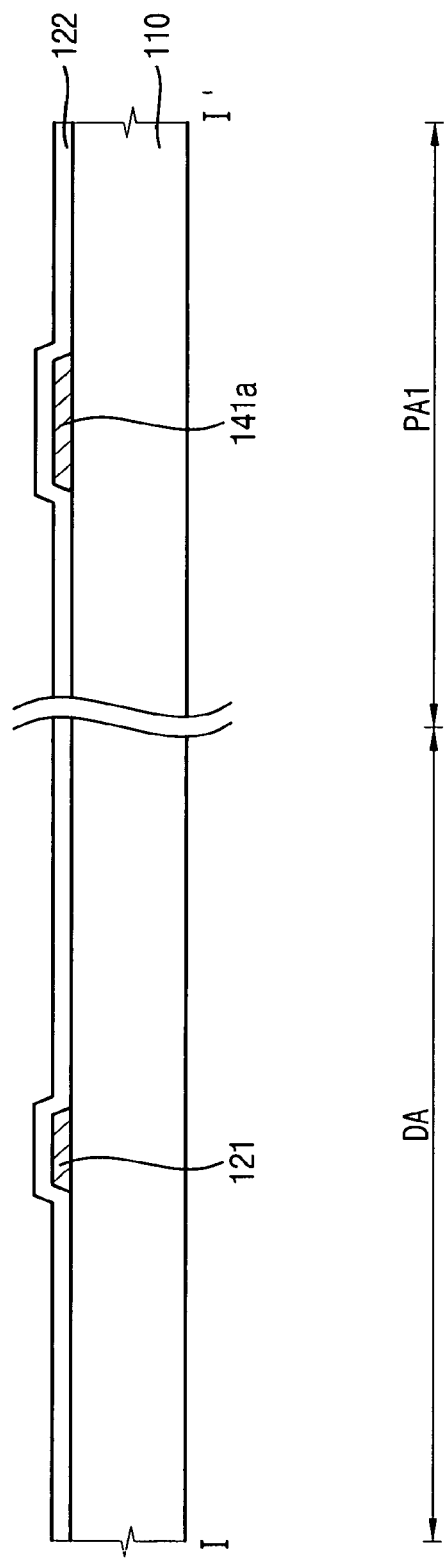

Referring to FIG. 4C, the gate insulating layer 122 is formed on the transparent substrate 110 on which the gate electrode 121 and the first electrode 141a are formed. In one example, the gate insulating layer 122 is deposited on the transparent substrate 110 by a plasma-enhanced chemical vapor deposition (PECVD) method and has a thickness of about 4500 angstroms.

Figure 4D:
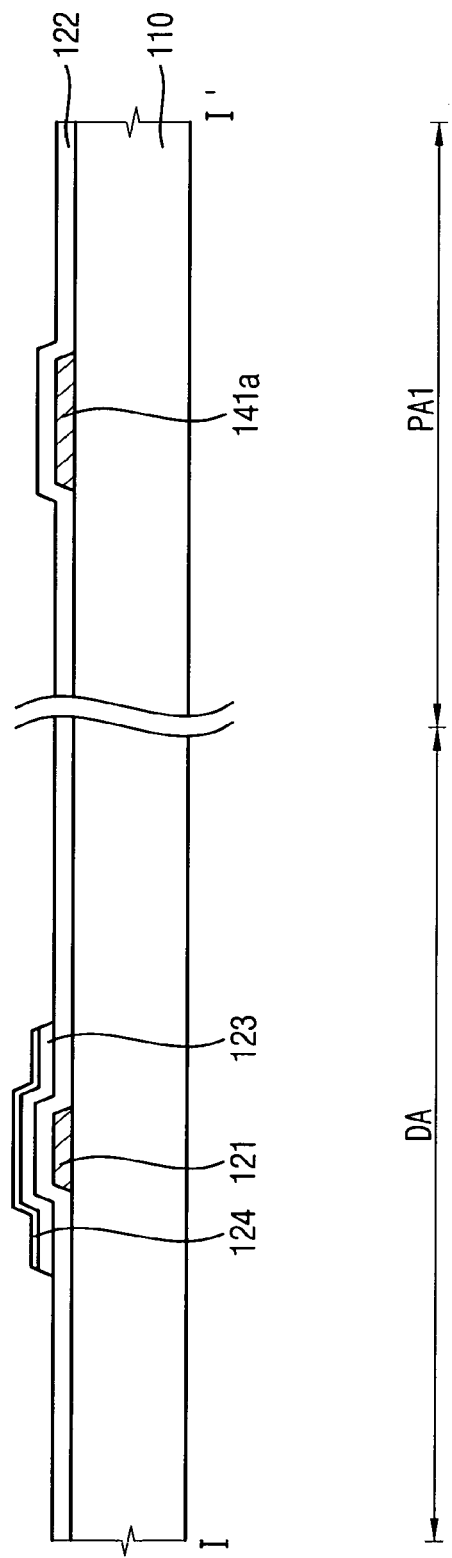

Referring to FIG. 4D, a polycrystalline silicon layer (not shown) is deposited on the gate insulating layer 122, and then an N+ polycrystalline silicon layer (not shown) is deposited on the polycrystalline silicon layer. The polycrystalline silicon layer and the N+ polycrystalline silicon layer are deposited by the PECVD method in one example. The polycrystalline silicon layer and the N+ polycrystalline silicon layer are then patterned forming the active layer 123 and the ohmic contact layer 124, respectively, over the gate electrode 121.

Referring to FIGS. 4E and 4F, a second metal layer 172 is deposited (e.g., by the sputtering method) on the gate insulating layer 122 on which the active layer 123 and the ohmic contact layer 124 are formed. The second metal layer 172 includes a conductive metal material, for example chromium (Cr), molybdenum (Mo), aluminum (Al), or aluminum alloy such as aluminum-neodymium (AlNd), etc.

When the second metal layer 172 is patterned, the source and drain electrodes 125 and 126 are formed in the display area DA and the second electrode 141b is formed corresponding to the first electrode 141a. Thus, the first main capacitor 141 is formed in the first peripheral area PA1.

A portion of the ohmic contact layer 124 exposed between the source electrode 125 and the drain electrode 126 is removed (e.g., by a reactive ion etching (RIE) method) to form the channel area CA. Thus, the TFT 120 is formed in the display area DA.

Figure 4G:
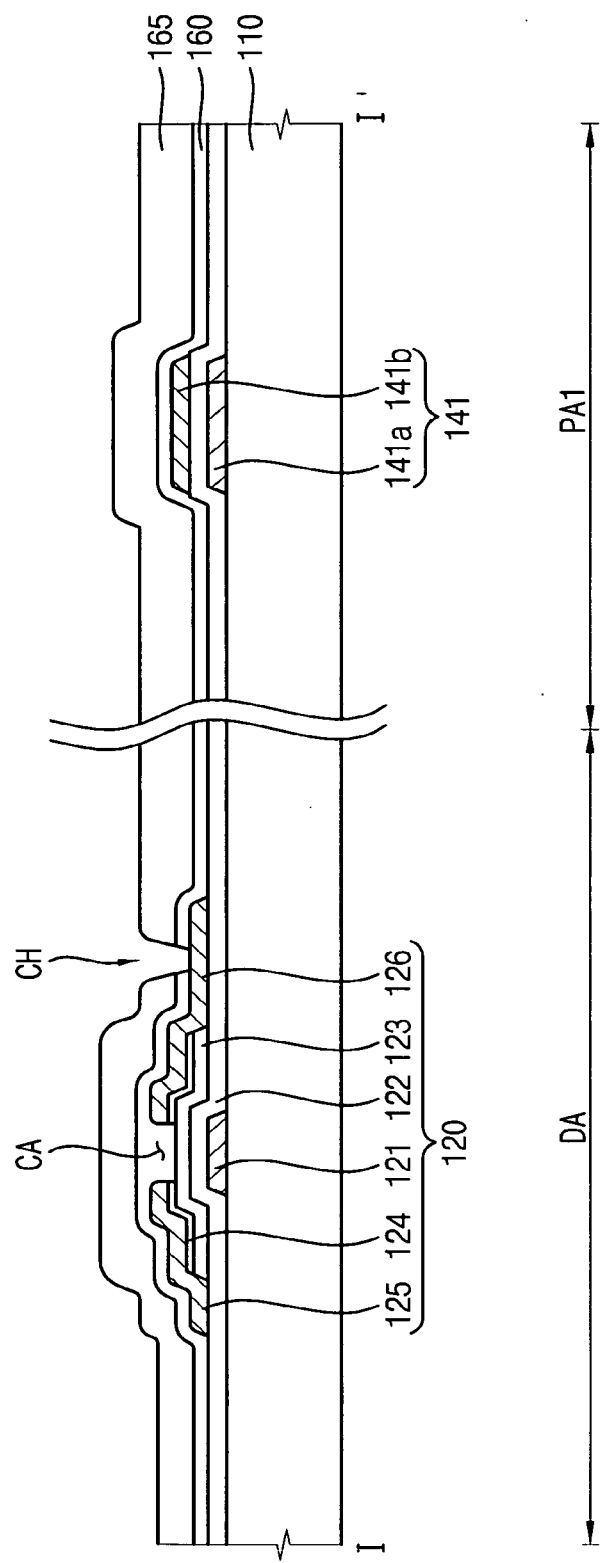

Referring to FIG. 4G, the passivation layer 160 and the organic insulating layer 165 are sequentially formed over the transparent substrate 110 on which the TFT 120 and the first main capacitor 141 are formed. The passivation layer 160 and the organic insulating layer 165 are partially removed from the display area DA such that the contact hole CH is formed through the passivation layer 160 and the organic insulating layer 165.

As shown in FIG. 3, the pixel electrode 130 electrically connected to the TFT 120 is formed on the organic insulating layer 165 in the display area DA, thereby completing the first substrate 100.

Figure 5:
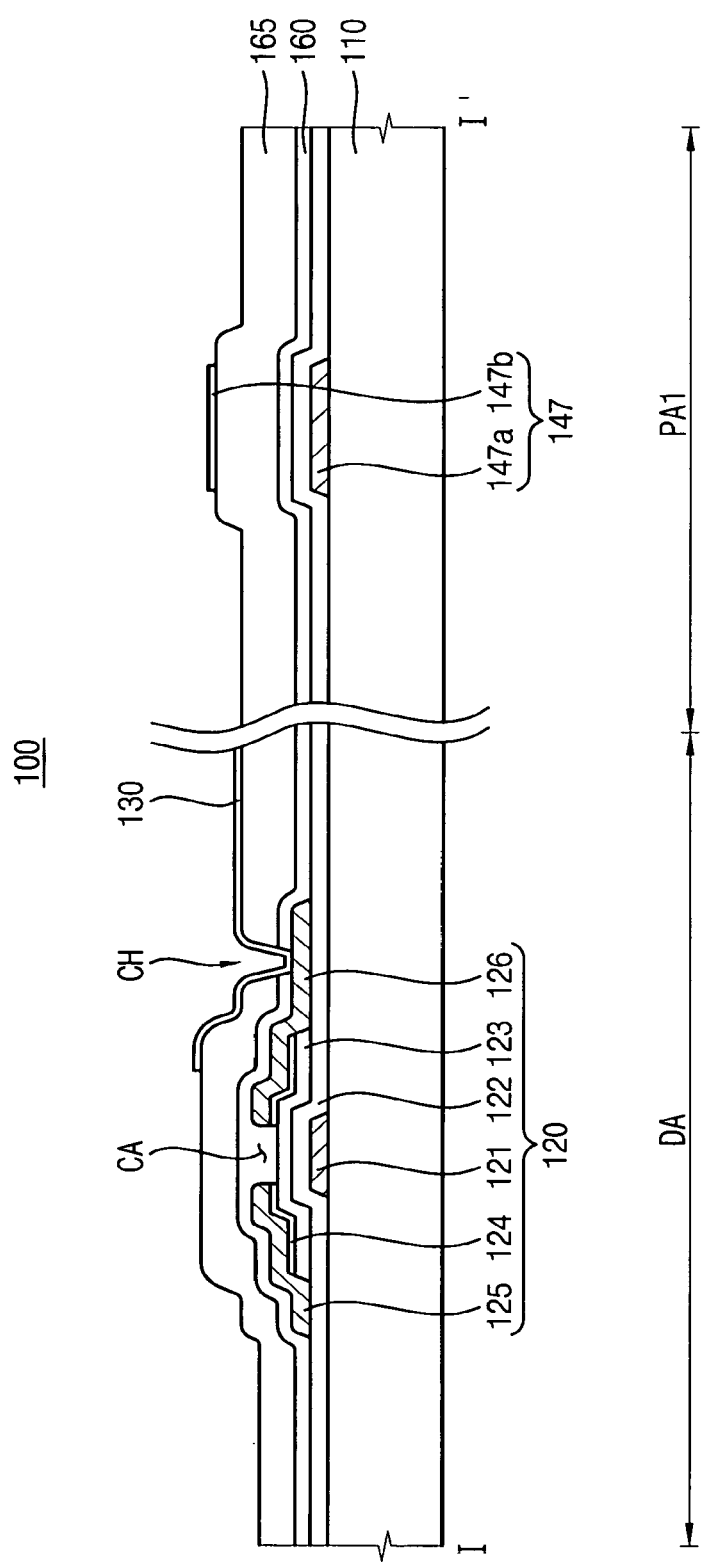
FIG. 5 is a cross-sectional view showing a first main capacitor according to another embodiment of the present invention.

FIG. 5 is a cross-sectional view showing a first main capacitor according to another embodiment of the present invention. In FIG. 5, the same reference numerals denote the same or similar elements in FIG. 3, and thus the detailed descriptions of the same or similar elements will be omitted.

Referring to FIG. 5, a first main capacitor 147 includes a first electrode 147a formed on the transparent substrate 110 and a second electrode 147b disposed over the first electrode 147a.

In the present embodiment, the first electrode 147a is formed on a same layer as a layer on which the gate electrode 121 of the TFT 120 is formed, and the first electrode 147a includes a same material as the gate electrode 121. In another embodiment, the first electrode 147a may be formed on a same layer as a layer on which the source and drain electrodes 125 and 126 are formed. When the first electrode 147a is formed on a same layer as a layer on which the source and drain electrodes 125 and 126 are formed, the first electrode 147a is formed while the source and drain electrodes 125 and 126 are formed, and the first electrode 147a includes a same material as the source and drain electrodes 125 and 126.

The gate insulating layer 122, the passivation layer 160, and the organic insulating layer 165 are sequentially formed over the first electrode 147a.

The second electrode 147b is formed on the organic insulating layer 165 corresponding to the first electrode 147a. The second electrode 147b is formed on a same layer as a layer of the pixel electrode 130 in the display area DA, and the second electrode 147b includes a same material as the pixel electrode 130.

In the present embodiment, since the first electrode 147a is formed on the same layer as the layer on which the gate electrode 121 is formed, the gate insulating layer 122, the passivation layer 160, and the organic insulating layer 165 formed between the first and second electrodes 147a and 147b may function as a dielectric substance of the first main capacitor 147.

However, in the case that the first electrode 147a is formed on the same layer as the layer on which the source and drain electrodes 125 and 126 are formed, only the passivation layer 160 and the organic insulating layer 165 (and not the gate insulating layer 122) are disposed between the first and second electrodes 147a and 147b. The passivation layer 160 and the organic insulating layer 165 may then function as the dielectric substance of the first main capacitor 147.

FIGS. 6A to 6F are views illustrating a method of manufacturing the first main capacitor in FIG. 5. In FIGS. 6A to 6F, the same reference numerals denote the same or similar elements as in FIGS. 4A to 4C, and thus the detailed descriptions of the same or similar elements will be omitted.

Figure 6A:
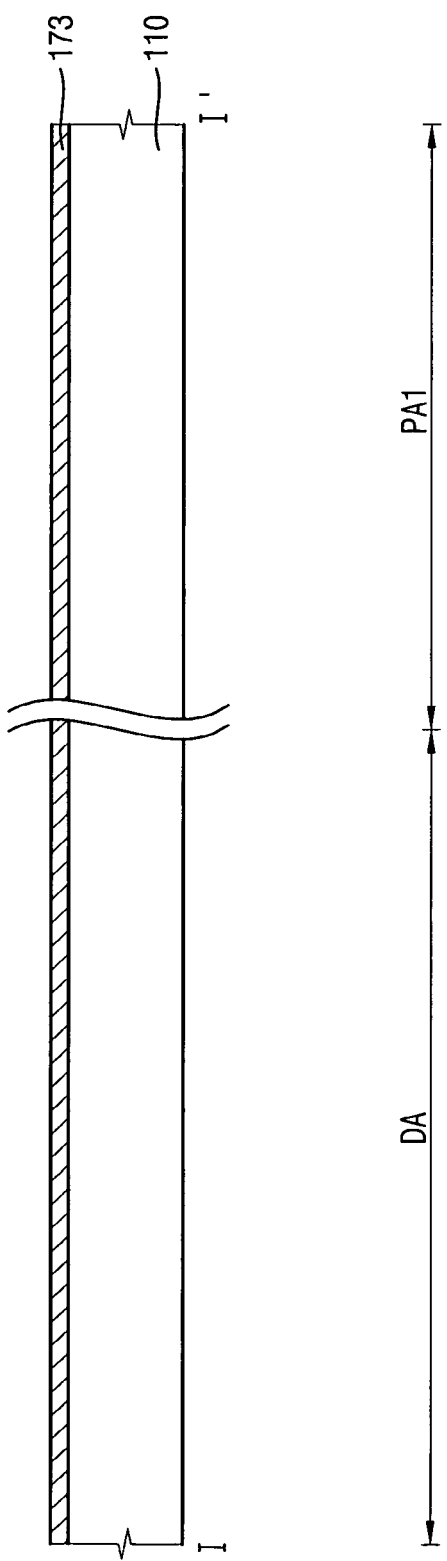

Referring to FIG. 6A, a first metal layer 173 is formed on the transparent substrate 110 by a sputtering method in one example. The first metal layer 173 includes a conductive metal material such as chromium (Cr), molybdenum (Mo), aluminum (Al), or aluminum alloy such as aluminum-neodymium (AlNd), etc.

Figure 6B:
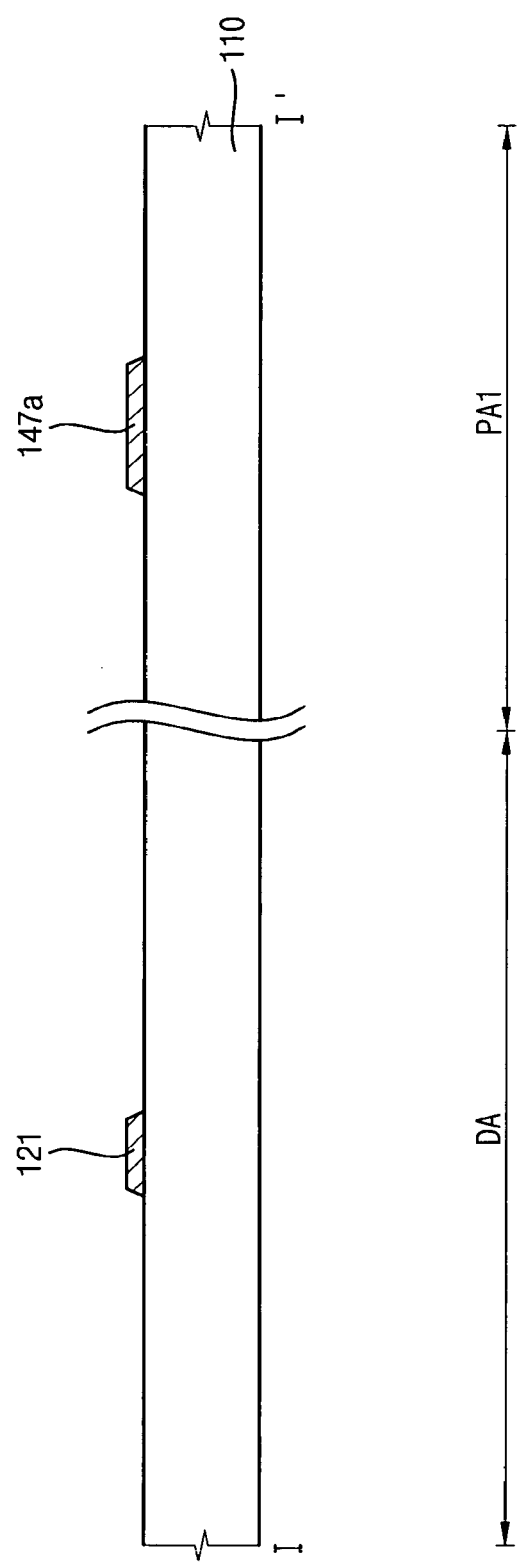

Referring to FIG. 6B, the first metal layer 173 is patterned to form the gate electrode 121 in the display area DA and the first electrode 147a of the first main capacitor 147 in the first peripheral area PA1.

Referring to FIG. 6C, the gate insulating layer 122, the active layer 123, and the ohmic contact layer 124 are formed on the transparent substrate 110 on which the gate electrode 121 and the first electrode 147a are formed. A second metal layer 174 is deposited on the gate insulating layer 122 on which the active layer 123 and the ohmic contact layer 124 are formed by the sputtering method. The second metal layer 174 includes a conductive metal material, such as chromium (Cr), molybdenum (Mo), aluminum (Al), or aluminum alloy such as aluminum-neodymium (AlNd), etc.

Referring to FIG. 6D, when the second metal layer 174 is patterned, the source and drain electrodes 125 and 126 are formed in the display area DA. A portion of the ohmic contact layer 124 exposed between the source electrode 125 and the drain electrode 126 is removed (e.g., by a reactive ion etching (RIE) method) to form the channel area CA. Thus, the TFT 120 is formed in the display area DA.

Referring to FIG. 6E, the passivation layer 160 and the organic insulating layer 165 are sequentially formed on the transparent substrate 110 on which the source and drain electrodes 125 and 126 are formed. The passivation layer 160 and the organic insulating layer 165 are partially removed from the display area DA such that the contact hole CH is formed through the passivation layer 160 and the organic insulating layer 165, thereby partially exposing the drain electrode 126.

Referring to FIGS. 5 and 6F, a third metal layer 175, such as ITO or IZO, is formed on the organic insulating layer 165 through which the contact hole CH is formed. The third metal layer 175 is patterned to form the pixel electrode 130 in the display area DA and the second electrode 147b in an area corresponding to the first electrode 147a. Thus, the first main capacitor 147 is formed in the first peripheral area PA1.

Figure 7:
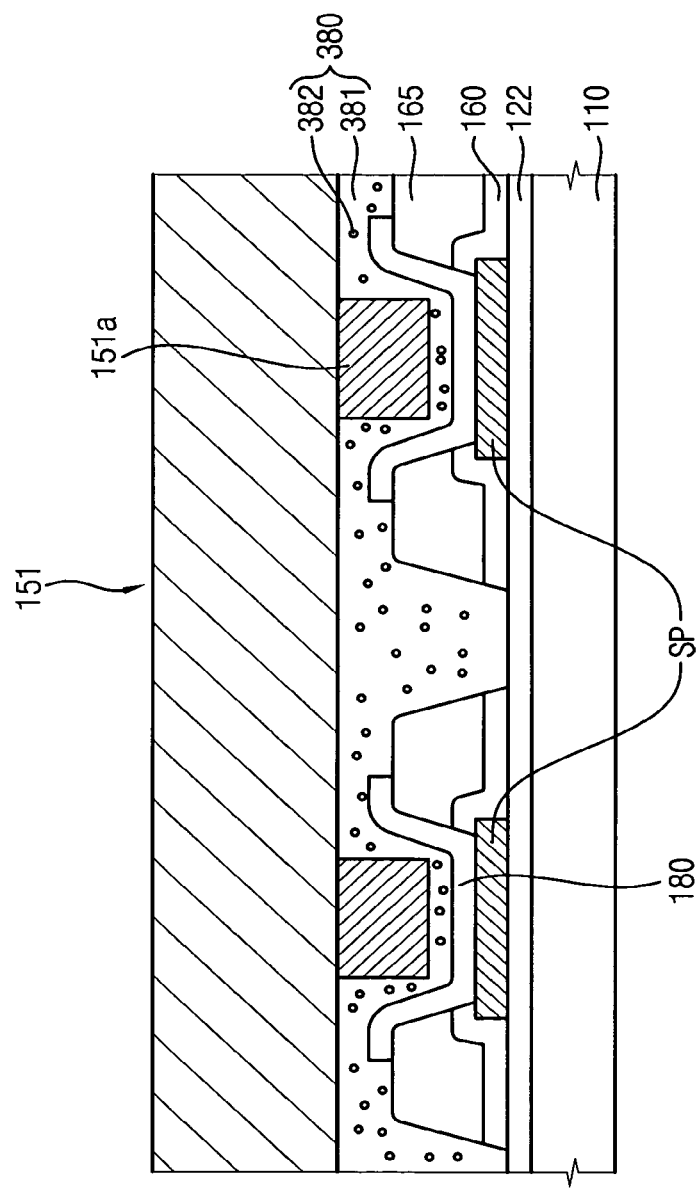
FIG. 7 is a cross-sectional view showing a first sub capacitor in FIG. 2.

FIG. 7 is a cross-sectional view showing a first sub capacitor in FIG. 2. In the present embodiment, each of the first, second, and third sub capacitors 151, 152, and 153 has the same function and structure. Accordingly, the first sub capacitor 151 will be described in detail, and detailed description of the second and third sub capacitors 152 and 153 will be omitted.

Referring to FIGS. 2 and 7, the first sub capacitor 151 includes a plurality of output terminals 151a. In the present embodiment, the first sub capacitor 151 has a similar shape to a semiconductor chip, but the first sub capacitor 151 may have a structure wrapped with a dielectric substance.

The output terminals 151a are electrically connected to the pads SP formed on the gate insulating layer 122 in the second peripheral area PA2. The pads SP are formed at ends of signal lines SL electrically connected to the driving chip 320, respectively, and correspond to the output terminals 151a.

The passivation layer 160 and the organic insulating layer 165 are sequentially formed on the signal lines SL, and partially removed to expose the pads SP.

A transparent electrode 180 is formed on the organic insulating layer 165 and electrically connected to the pads SP exposed through the removed area of the passivation layer 160 and the organic insulating layer 165.

The first substrate 100 further includes a conductive adhesive member 380 to hold the first sub capacitor 151. The conductive adhesive member 380 is formed between the transparent substrate 110 and the first sub capacitor 151. On the other hand, the first sub capacitor 151 may be fixed to the transparent substrate 110.

The conductive adhesive member 380 includes an adhesive resin 381 and conductive particles 382 irregularly distributed in the adhesive resin 381. The pads SP are electrically connected to the output terminals 151a through the conductive adhesive member 380.

Thus, when the second driving voltage is applied to the signal lines SL from the driving chip 320, the pads SP apply the second driving voltage to the first sub capacitor 151 through the conductive adhesive member 380 and the transparent electrode 180.

The first sub capacitor 151 boosts the second driving voltage from the pads SP, and the boosted second driving voltage is applied to the pads SP through the conductive adhesive member 380 and the transparent electrode 180. The signal lines SL then apply the boosted second driving voltage to the driving chip 320.

Figure 8:
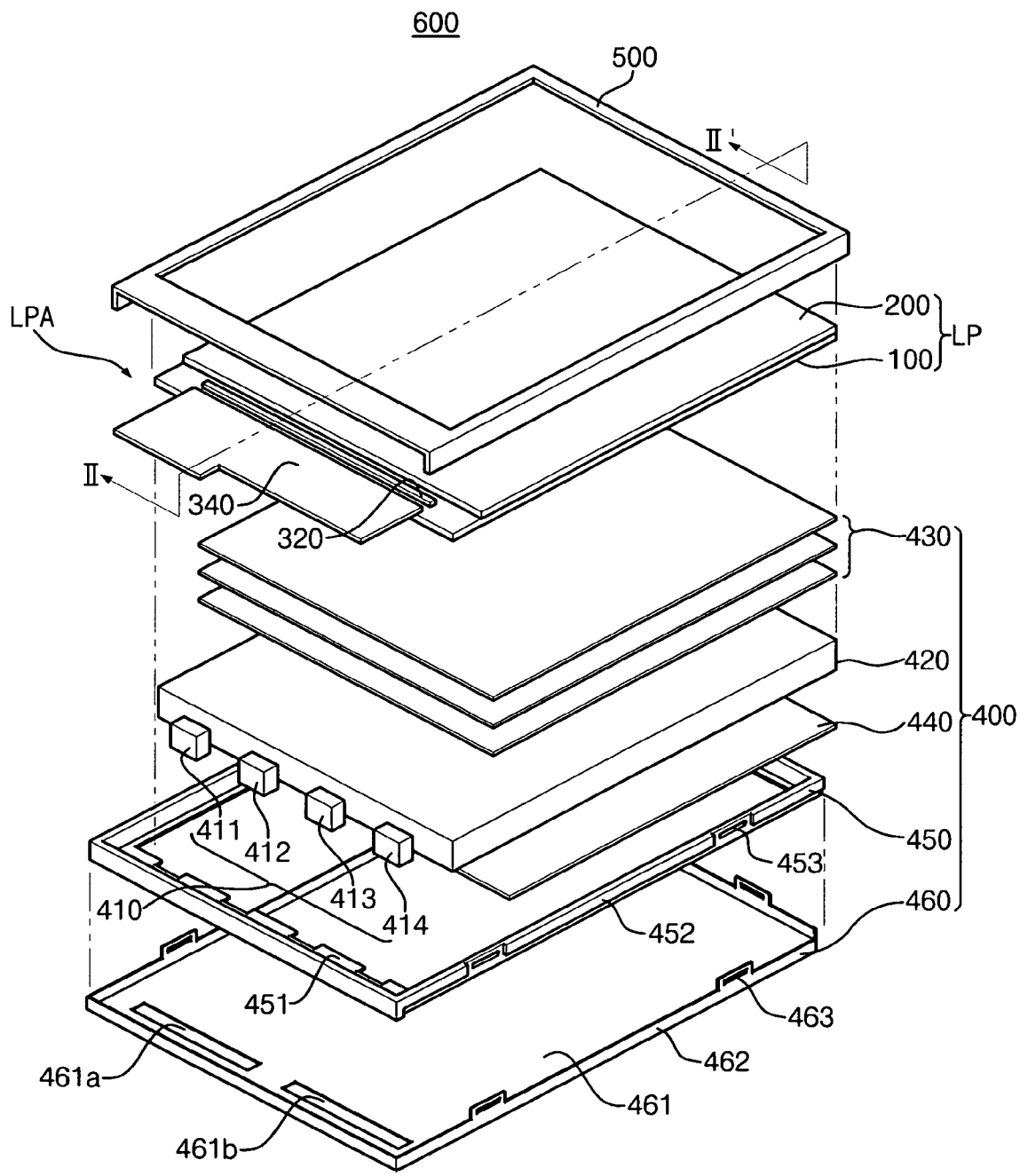
FIG. 8 is an exploded perspective view showing a liquid crystal display apparatus according to an embodiment of the present invention.
Figure 9:
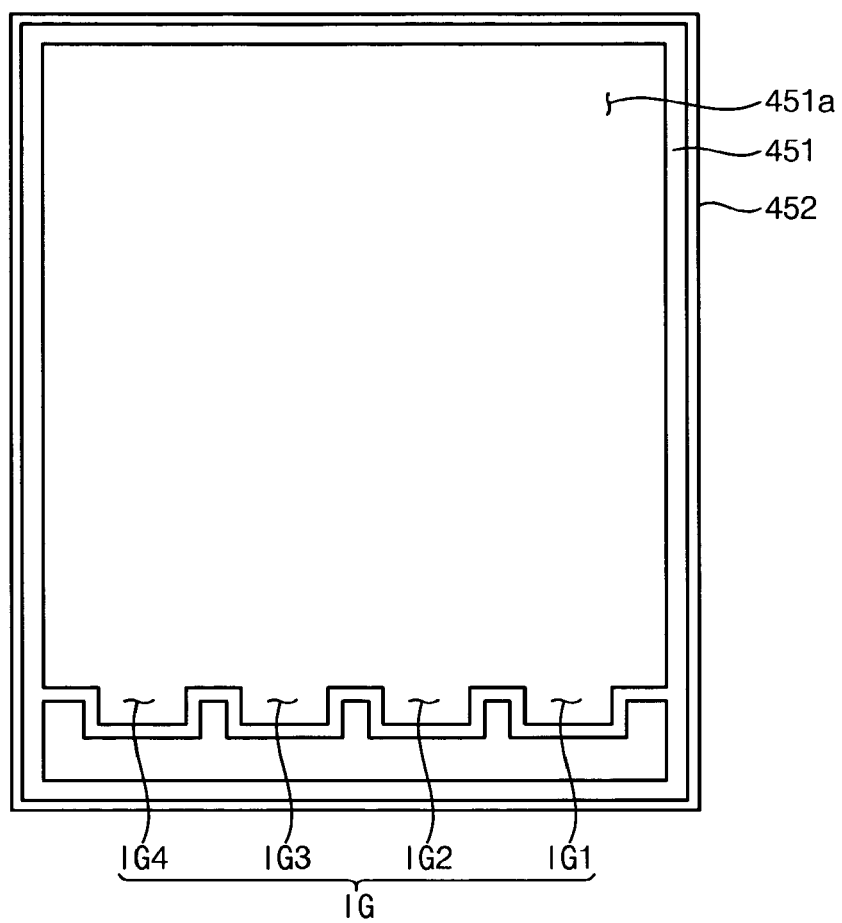
FIG. 9 is a plan view showing a first receiving container in FIG. 8.

FIG. 8 is an exploded perspective view showing a liquid crystal display apparatus according to an embodiment of the present invention. FIG. 9 is a plan view showing a first receiving container in FIG. 8.

Referring to FIG. 8, a liquid crystal display apparatus 600 includes a display panel assembly LPA that displays an image using a light, a backlight assembly 400 that provides the display panel assembly LPA with the light, and a top chassis 500 that fixes the display panel assembly LPA to the backlight assembly 400.

In the present embodiment, the display panel assembly LPA has the same or similar function and structure as those of the display panel assembly in FIG. 1, and thus any further repetitive descriptions of the display panel assembly LPA will be omitted.

The backlight assembly 400 is disposed under the display panel assembly LPA to provide a liquid crystal display panel LP with the light uniformly.

In one embodiment, the backlight assembly 400 includes light sources 410 emitting the light, a light guide plate 420 guiding the light, optical sheets 430 adjusting brightness of the light and providing the liquid crystal display panel LP with the adjusted light, a reflecting plate 440 reflecting the light leaking from the light guide plate 420, a mold frame 450, and a bottom chassis 460.

The light sources 410 are disposed at an end of the light guide plate 420 and provide the light guide plate 420 with the light. The light sources 410 include first, second, third, and fourth light emitting diodes (LEDs) 411, 412, 413, and 414 to reduce a size and power consumption thereof. The number of light sources may increase or decrease in accordance with the desired size of the liquid crystal display panel LP.

The first, second, third, and fourth LEDs 411, 412, 413, and 414 may be mounted on the flexible circuit part 340 of the display panel assembly LPA or on a separate flexible circuit part controlling the light sources 410.

The optical sheets 430 are disposed between the light guide plate 420 and the liquid crystal display panel LP. The optical sheets 430 improve light characteristics such as brightness, uniformity, etc., of the light from the light guide plate 420 to provide the liquid crystal display panel LP with the light.

The reflecting plate 440 is disposed under the light guide plate 420 between the light guide plate 420 and the mold frame 450. The reflecting plate 440 reflects the light leaking from the light guide plate 420 to enhance a light efficiency.

The mold frame 450 receives the light sources 410, the light guide plate 420, the optical sheets 430, the reflecting plate 440, and the liquid crystal display panel LP. The mold frame 450 includes synthetic resin. The mold frame 450 includes a bottom 451 and a sidewall 452 extended from the bottom 451.

As shown in FIG. 9, the mold frame 450 includes an opening 451a formed through the bottom 451 and recesses IG formed at a first end of the bottom 451 and spatially connected to the opening 451a. The recesses IG include first, second, third, and fourth recesses IG1, IG2, IG3, and IG4. However, the number of recesses IG are equal to numbers of the light sources 410. The first, second, third, and fourth LEDs 411, 412, 413, and 414 are inserted into the first, second, third, and fourth recesses IG1, IG2, IG3, and IG4, respectively. The mold frame 450 includes protrusions 453 (FIG. 8) formed at the sidewall 452 for connecting to corresponding tabs 463 on the bottom chassis 460.

The mold frame 450 is received in the bottom chassis 460, which is made of a metal material in one example. The bottom chassis 460 includes a bottom 461 and a sidewall 462 extended from an edge of the bottom 461. The bottom chassis 460 includes a first hole 461a and a second hole 461b formed through the bottom 461 such that lower portions of the light sources 410 are inserted. In the present embodiment, the first and second holes 461a and 461b have the same size, but the number of holes may be increased or decreased according to the number of LEDs, and the size of the holes depends upon the number of LEDs. In the present embodiment, the first and second LEDs 411 and 412 are inserted into the first hole 461a, and the third and fourth LEDs 413 and 414 are inserted into the second hole 461b.

The top chassis 500 is disposed on the liquid crystal display panel LP. The top chassis 500 covers the liquid crystal display panel LP such that the display area DA (FIG. 2) is exposed while the top chassis 500 is coupled to the bottom chassis 460.

Figure 10:
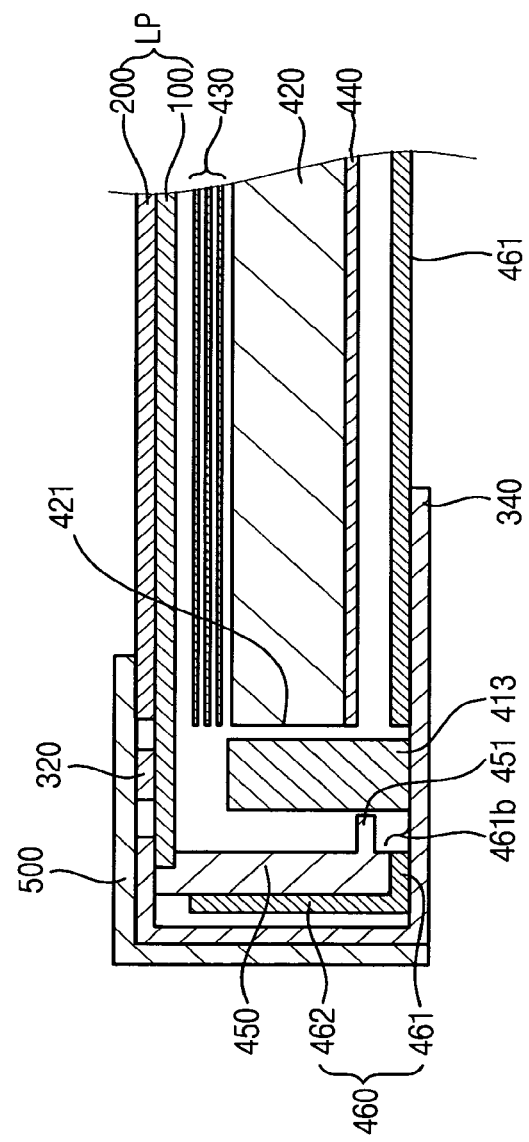
FIG. 10 is a cross-sectional view taken along a line II-II' in FIG. 8 showing the liquid crystal display apparatus.

FIG. 10 is a cross-sectional view taken along a line II-II' showing the liquid crystal display apparatus in FIG. 8.

Referring to FIG. 10, the reflecting plate 440, the light guide plate 420, and the optical sheets 430 are sequentially received on the bottom 451 of the mold frame 450.

The mold frame 450 includes a stepped portion formed on the sidewall 452, and the liquid crystal display panel LP is received on the stepped portion. The flexible circuit part 340 attached to the source side of the liquid crystal display panel LP is bent along the sidewall 462 and disposed on a rear side of the bottom chassis 460.

As shown in FIG. 2, the liquid crystal display panel LP includes the main capacitor part 140 and the sub capacitor part 150 so as to boost the second driving voltage. Thus, at least an insulating film, a conductive layer, and an adhesive layer for the flexible circuit part 340 may be eliminated since the flexible circuit part 340 does not require any additional capacitor for boosting the second driving voltage. As a result, the thickness and the manufacturing cost of the flexible circuit part 340 may be reduced.

According to the above, the liquid crystal display panel includes the main and sub capacitor parts for boosting the second driving voltage, and the driving chip receives the boosted second driving voltage to output the first driving voltage. Thus, the flexible circuit part is not required to have the additional capacitor for boosting the second driving voltage, and the thickness and the manufacturing cost of the flexible circuit part may be reduced.

Although embodiments of the present invention have been described, it is understood that the present invention should not be limited to these embodiments but various changes and modifications can be made by one of ordinary skill in the art within the spirit and scope of the present invention as hereinafter claimed.

What is claimed is:

1. A method of manufacturing a display panel, comprising:
   forming a first metal layer on a substrate;
   patterning the first metal layer to form a gate electrode in a first area on which an image is displayed and a first electrode of a first capacitor in a second area surrounding the first area;
   forming an insulating layer on the substrate on which the gate electrode and the first electrode are formed; and
   forming a second electrode of the first capacitor on the insulating layer corresponding to the second area,
   forming a second capacitor having a different capacitance from the first capacitor in a third area adjacent to the second area.

2. The method of claim 1, further comprising:
   forming a second metal layer on the insulating layer; and
   patterning the second metal layer to form a source electrode and a drain electrode in the first area and a second electrode of the first capacitor in the second area.

3. The method of claim 1, further comprising:
   forming a second metal layer on the insulating layer;
   patterning the second metal layer to form a source electrode and a drain electrode in the first area;
   forming a third metal layer on the insulating layer on which the source and drain electrodes are formed; and
   patterning the third metal layer to form a pixel electrode in the first area and a second electrode of the first capacitor in the second area.

4. A method of manufacturing a display panel, comprising:
   forming a first metal layer on a substrate;
   patterning the first metal layer to form a source electrode and a drain electrode in a first area on which an image is displayed and a first electrode of a first capacitor in a second area surrounding the first area;
   forming an insulating layer on the substrate on which the source electrode, the drain electrode, and the first electrode are formed;
   forming a second metal layer on the insulating layer; and
   patterning the second metal layer to form a pixel electrode in the first area and a second electrode of the first capacitor in the second area,
   forming a second capacitor having a different capacitance from the first capacitor in a third area adjacent to the second area.

* * * * *